: 3,600,133
Patented Aug. 17, 1971

3,600,133
METHOD FOR DETERMINING THE STRENGTH OF EMULSIONS
Gareth G. Price, Bernard Wheelahan, and Simon D. E. Stafford-Gaffney, Melbourne, Victoria, Australia, assignors to Shell Oil Company, New York, N.Y.
No Drawing. Filed Apr. 17, 1969, Ser. No. 817,146
Claims priority, application Australia, Apr. 22, 1968, 36,696/68
Int. Cl. C09k 3/00; G01n 31/22, 33/26
U.S. Cl. 23—230
11 Claims

ABSTRACT OF THE DISCLOSURE

A method for determining the emulsion strength of an aqueous emulsion using a novel marking agent and indicator and comparing it against a standard emulsion.

BACKGROUND OF THE INVENTION

When preparing aqueous emulsions from soluble oils, e.g., oils which are emulsifiable with water, it is often desirable to determine or to check the strength of the emulsion, before as well as during the use of the emulsion. Especially when this has to be done on the spot during field operations, as is particularly the case for rock drilling, e.g., tungsten carbide, more particularly diamond rock drilling, e.g., for core drilling for geological exploration, there is a need for a simple and rapid method requiring a minimum of skill and apparatus and which can also be used where the emulsion is being more or less heavily contaminated, e.g., by drilling debris, during use. Such a method is aimed at by the invention.

SUMMARY OF THE INVENTION

The invention relates to a method for determining the emulsion strength of an aqueous emulsion of a soluble oil, comprising adding a marking agent to a soluble oil containing an oil and at least one emulsifier, extracting the marking agent from an emulsion of the soluble oil with an indicator and ascertaining the emulsion strength by direct or indirect comparison with similarly treated emulsions of known strength.

The invention furthermore relates to a soluble oil containing a minor proportion of a marking agent as herein described. The invention is also applicable to e.g., metal working emulsions.

The marking agent can largely vary in nature provided that it is sufficiently oil-soluble and water-insoluble.

Thus, compounds fulfilling these conditions and containing a radio-active tracer or a substantially colorless compound, such as certain metal salts, which form a colored complex with e.g., a complexing agent of the indicator can suitably be used.

Preferably, the marking agent is a dye, which can in principle by any substantially oil-soluble, water-insoluble dye, in particular bright colored, color-fast dyes, including basic dyes. Suitable dyes are the Waxoline dyes (manufactured by Imperial Chemical Industries), in particular Type A Waxoline dyes in view of their good solubility in organic solvents and oils. Especially suitable is Waxoline Red OM. The indicator is preferably an organic solvent.

Suitable solvents are alcohols such as normal and secondary butyl alcohol and tertiary amyl alcohol; furfural; ethers such as ethyl ether; ketones in particular methyl ethyl ketone.

Especially when a basic dye is used the solvent should preferably be acidified, e.g., by the addition of an organic acid, preferably acetic acid, more preferably a solution of acetic acid in water. Minor proportions, preferably 0.1–10% w., more preferably 0.5–2% w., based on the solvent of acid are in general sufficient.

The amount of indicator can be 0.1–10, preferably 0.5–5 times the amount of emulsion. If the emulsion is heavily contaminated, a larger amount of indicator is desirable.

The soluble oil should preferably form an oil-in-water emulsion when diluted with water. The proportion of soluble oil in the emulsion can be 0.1–20, preferably 0.1–10, more preferably 0.25–5% w. based on the emulsion.

The oil base of the soluble oil is preferably a lubricating oil, in particular a mineral lubricating oil, such as one having a low viscosity index, e.g., lower than 40, and having a viscosity of 50–200 SUS at 20° C.

The emulsifier of the soluble oil is preferably a non-ionic emulsifier, in particular a combination of non-ionic emulsifiers. As non-ionic emulsifiers condensation products of alkylene oxides, in particular ethylene oxide, are preferred. Suitable products are condensation products of 2–18 mols ethylene oxide and 1 mol alkylated phenols, such as mono- and di-alkyl phenols having straight or branched $C_{0-20}$ in particular $C_9$ alkyl groups, or 1 mol of an aliphatic alcohol containing 8–20 carbon atoms, or 1 mol saturated or unsaturated aliphatic carboxylic acids containing 8–20 carbon atoms, in particular tall oil acids, which consist mainly of oleic, linoleic and rosin acids.

Especially suitable are condensation products of 1 mol monoalkyl phenol and 2–7 mols ethylene oxide, 1 mol dialkyl phenol and 12–18 mols ethylene oxide and 1 mol of tall oil acids and 2–7 mols of ethylene oxide and mixtures thereof.

These emulsifiers may each be used in a proportion of 0.1–20, preferably 1–10% w., based on the soluble oil.

PREFERRED EMBODIMENT OF THE INVENTION

Such soluble oils have the advantage of being stably emulsifiable with hard and saline water, such as ground waters, even sea water. This is very valuable if the emulsions have to be used to cool and lubricate rock drills, in particular diamond rock drills, under conditions where available ground or sea water has to be used. Such oils, moreover, provide protection against corrosion and may contain special anti-corrosion agents or other additives.

Diamond rock drills will have to be used when drilling in very hard rocks, such as acid rocks containing high proportions of $SiO_2$.

The proportion of dye in the soluble oil can be 0.005–5 preferably 0.01–2% w. e.g., 0.05% w. based on the soluble oil.

The invention is illustrated by the following example.

Soluble oil

85% LVI Mineral lubricating oil, viscosity 50 Redwood I at 140° F.
6% w. of the condensation product of 1 mol tall oil acids and 5 mols ethylene oxide
6% w. of the condensation product of 1 mol dinonyl phenol and 15 mols ethylene oxide
4% w. of the condensation product of mono-nonyl phenol and 5 mols ethylene oxide
0.05% w. Waxoline Red OM.

Emulsion 0.25–4% w. of said soluble oil and
99.75–96% of water.

Indicator

94% w. methyl ethyl ketone
5% w. water
1% w. acetic acid.

The emulsion is circulated during penetration of a hard rock with a diamond drill and a sample of the emulsion is drawn from the sump and treated with a fixed volume of the indicator (ratio emulsion:indicator 1:1–1:2). The emulsion then breaks and separates in an upper layer, which consists of methyl ethyl ketone containing oil, dye and is saturated with water, and a lower layer, which consists of water saturated with methyl ethyl ketone and retaining drilling residue minerals.

Standard emulsions are treated similarly to provide calibration scale or colored chart.

The color of the upper layer is then compared against the series of standards, or any calibration scale or colored charts or the like derived therefrom, to determine the concentration of the original sample.

We claim:

1. Method for determining the emulsion strength of an aqueous emulsion of a soluble oil, comprising adding a marking agent to a soluble oil containing an oil and at least one emulsifier, extracting the marking agent from an emulsion of the soluble oil with an indicator and ascertaining the emulsion strength by direct or indirect comparison with similarly treated emulsions of known strength.

2. Method according to claim 1, wherein the marking agent is a dye.

3. Method according to claim 2, wherein the dye is a substantially oil-soluble, water-insoluble dye.

4. Method according to claim 1, wherein the marking agent is a substantially colorless compound, which forms a colored complex with the indicator.

5. Method according to any one of claims 1 to 4, wherein the indicator is an organic solvent.

6. Method according to claim 5, wherein the organic solvent is methyl ethyl ketone.

7. Method according to claim 5, wherein the solvent is made acid by addition of minor proportions of an organic acid.

8. Method according to claim 7, wherein the organic acid is an aqueous solution of acetic acid.

9. Method according to claim 1, wherein the oil base of the soluble oil is a lubricating oil, in particular a mineral lubricating oil.

10. Method according to claim 9, wherein the emulsifier is a non-ionic emulsifier.

11. Method according to claim 10, wherein the emulsifier is a reaction product of alkyl phenol and alkylene oxide.

References Cited

FOREIGN PATENTS 1,103,275   2/1968   Great Britain _____ 73—61.1

MORRIS O. WOLK, Primary Examiner

R. M. REESE, Assistant Examiner

U.S. Cl. X.R.

73—61.1; 252—408